United States Patent [19]
Anderson

[11] 3,801,420
[45] Apr. 2, 1974

[54] PLASTIC QUILTED BEDSPREAD

[76] Inventor: Ann Anderson, 3220 W. Boston No. 203A, Detroit, Mich. 48206

[22] Filed: June 3, 1971

[21] Appl. No.: 149,515

[52] U.S. Cl................. 161/52, 5/334 R, 112/419, 112/420, 112/421, 161/50, 161/51, 161/119, 161/121, 161/147, 156/93
[51] Int. Cl............................................. B32b 3/06
[58] Field of Search................................ 161/50–52, 161/100, 121, 119, 147; 112/419–421; 5/334 R; 92/2; 156/93

[56] References Cited
UNITED STATES PATENTS

| | | | |
|---|---|---|---|
| 3,256,131 | 6/1966 | Koch et al. | 161/119 |
| 2,544,797 | 3/1951 | Lippmann | 5/334 R |
| 2,596,547 | 5/1952 | Guest | 5/334 R |
| 2,383,592 | 8/1945 | Davis | 5/334 R |
| 2,816,054 | 12/1957 | Howden | 161/120 X |
| 3,273,176 | 9/1966 | Millar | 5/334 R |
| 3,242,508 | 3/1966 | Smithson | 5/334 R |

Primary Examiner—Harold Ansher
Assistant Examiner—E. P. Robinson
Attorney, Agent, or Firm—Cullen Settle Sloman & Cantor

[57] ABSTRACT

A quilted water-proof plastic laminated bedspread which includes a washable vinyl top layer, a resilient padding filler layer, a third layer of interfacing and a bottom lining layer of water repellant nylon, all peripherally secured together by a binding and with a series of transverse continuous quilting stitches throughout the surfaces.

1 Claim, 4 Drawing Figures

PATENTED APR 2 1974  3,801,420

INVENTOR
ANN ANDERSON

BY Cullen, Settle, Sloman & Cantor

ATTORNEYS

PLASTIC QUILTED BEDSPREAD

BACKGROUND OF THE INVENTION

Heretofore, there appears to be a need for a quilted plastic or vinyl spread, that could be easy to care for in a matter of seconds, with a simple antiseptic soap solution, and wherein, the spread is luxurious in appearance, a time saver, as well as more sanitary.

BRIEF DESCRIPTION OF THE INVENTION

It is an object of the present invention to provide a luxurious vinyl quilted spread which can be machine washed if desired or where soiled spots can be removed by touching up by hand cleaning, and is particularly useful for households, hotels, nursing homes, dormitories, and is sanitary.

It is another object to provide quilted and laminated plastic type bedspread which is, essentially, waterproof or water-repellant and which includes a washable ornamented vinyl top layer, a resilient padding of a dacron fabre, or a urethane foam, a third layer of interfacing and a bottom layer of water-repellant nylon sheeting, all peripherally secured together with a suitable binding. It is another object to provide a quilted plastic washable laminated bedspread which consists of the washable vinyl top layer, resilient padding and an interfacing layer, all peripherally bound together and, wherein, there is provided a bottom lining layer of water-repellant nylon which is removably snap-fastened thereto for separate washing or replacement as desired.

These and other objects will be seen from the following specification and claims in conjunction with the appended drawing in which:

DETAILED DESCRIPTION OF THE INVENTION

Figure 1:
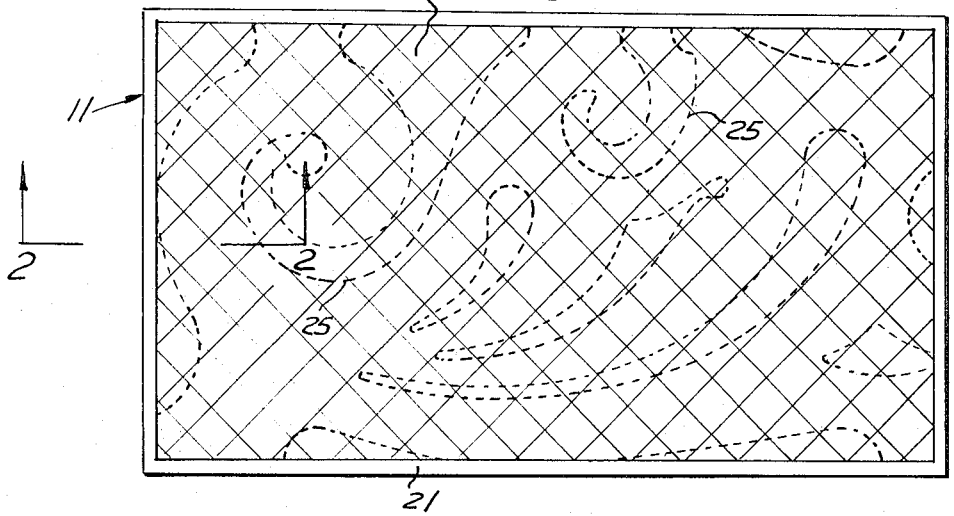
FIG. 1 is a plan view of the present quilted plastic laminated bedspread.
Figure 2:
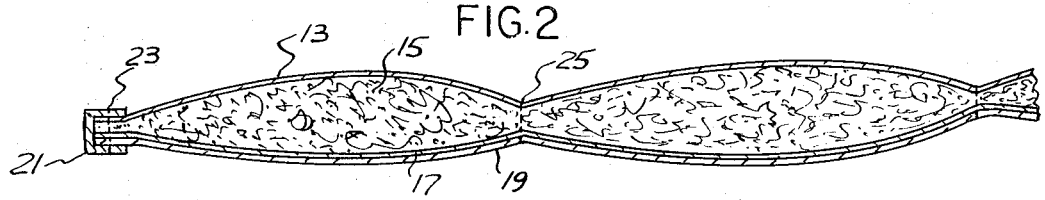
FIG. 2 is a fragmentary transverse section taken in the direction of arrows 2—2 of FIG. 1.
Figure 3:
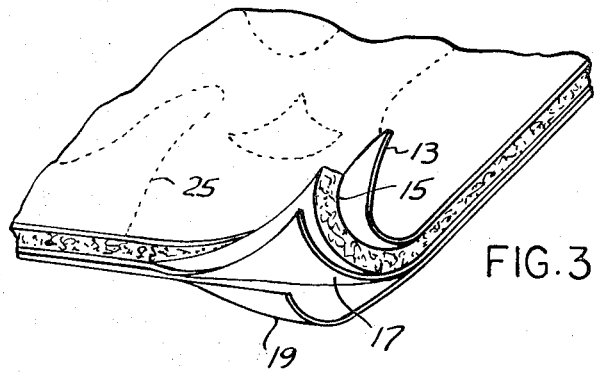
FIG. 3 is a fragmentary perspective view of the present bedspread with the layers partly opened up to show the laminations.

Referring to the drawing, the quilted plastic laminated bedspread generally indicated at 11, consists of the top ornamental layer of washable vinyl designated at 13 arranged in sheet form.

Immediately thereunder, there is provided a resilient padding layer 15 which may be made from a dacron fibre, or from a urethane foam or filling.

Thereunder, there is provided a third layer 17, namely, an interfacing which is partly stiff yet flexible.

Thereunder, is provided a bottom lining layer 19 of a water-repellant material, such as nylon sheeting.

A suitable binding or beading 21, generally of U-shape in cross section, extends around and overlies the respective marginal edges of the layers and is suitably stitched thereto as at 23.

It is contemplated that the beading or binding could be made of a vinyl plastic material and instead of stitching, could be welded in position by heat and pressure as an equivalent form of securing such binding and for securing all layers together peripherally.

A series of continuous quilting stitches 25 extend through all layers throughout the top surface to provide an ornamental quilting effect.

MODIFICATION

Figure 4:
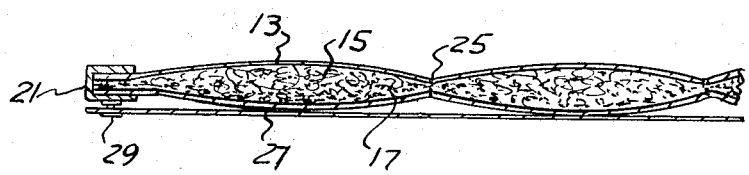
FIG. 4 is a transverse section of a modification.

In the modification, FIG. 4, there is included the first three layers; namely, the washable vinyl sheet top layer 13, the resilient padding filler layer 15 selected one from the group consisting of dacron fibre and urethane foam and a third interfacing layer 17.

These three layers are peripherally joined by the same binding 21 as above described which can be stitched or welded in place.

Removable lining layer 27, made of nylon and being water-repellant or water-proof is removably secured to the under surface of the three assembled first-mentioned layers by a series of snap fasteners 29.

The final completed product quilted at 25 gives the appearance of a luxurious vinyl quilted spread and eliminates the problem of washing and dry-cleaning.

The spread is particularly useful in rooms where young teens spend a great deal of time or for small children, for nursing homes, schools, colleges, dormitories, hospitals, hotels and motels.

The final product is a very useful quilted spread, wherein the vinyl material top layer is flexible and is ornamented or made of such material as to be particularly pleasing and attractive in appearance, and is useable on both sides.

The materials used are non-allergenic and, particularly, the resilient padding or filler layer which may be of a decron fibre or non-allergenic polyester and, thus, will be mildew-proof and moth-resistent. Alternately, the resilient padding layer may be made of a plastic urethane foam.

Under some conditions, the lining 27 as shown in FIG. 4 may be detachable to permit washing if desired for sanitary purposes.

Having described my invention, reference should now be had to the following claims.

1. A quilted plastic laminated bedspread comprising a washable vinyl sheet top layer;
   a resilient padding filler layer selected from the group consisting of dacron fibre and urethane foam;
   a third layer of interfacing material;
   a binding of U-shape extending around, overlying and stitched to the outer edges of all layers, said stitched edges defining the entire peripheral surface of said layers;
   a bottom layer of nylon water-repellant sheeting underlying said first layers;
   and a series of snap fasteners located at the ends of the outerface of said bottom layer removably connecting said bottom layer to said other layers.

* * * * *